United States Patent [19]
Renock

[11] 3,738,677
[45] June 12, 1973

[54] CONVERTIBLE GOLF CART

[76] Inventor: James Renock, 3625 W. Ruskin Avenue, Milwaukee, Wis. 53215

[22] Filed: May 27, 1971

[21] Appl. No.: 147,412

[52] U.S. Cl............. 280/37, 150/1.5 B, 280/DIG. 6
[51] Int. Cl............................................. B62b 1/04
[58] Field of Search................ 280/37, 41 C, 47.26, 280/DIG. 6; 206/16 E, 12; 150/1.5 B, 1.5 R

[56] References Cited
UNITED STATES PATENTS

| | | | |
|---|---|---|---|
| 1,742,137 | 12/1929 | De Grasse | 280/37 |
| 2,726,874 | 12/1955 | Sullivan | 280/37 |
| 2,801,738 | 8/1957 | Gabriel | 206/12 |
| 3,090,271 | 5/1963 | Castelli | 206/12 |
| 3,413,011 | 11/1968 | Weitzner | 280/37 |
| 3,459,327 | 8/1969 | Harris | 206/16 R |

Primary Examiner—Kenneth H. Betts
Assistant Examiner—David M. Mitchell
Attorney—Cyril M. Hajewski

[57] ABSTRACT

A wheeled golf cart which can be manually pulled over a golf course for transporting the golfing equipment. The entire cart can be converted into a closed container for the golfing equipment for storage. A hinged door serves as a closure for storage purposes and as a handle for manipulating the golf cart when it is transporting equipment over a golf course.

7 Claims, 5 Drawing Figures

PATENTED JUN 12 1973 3,738,677
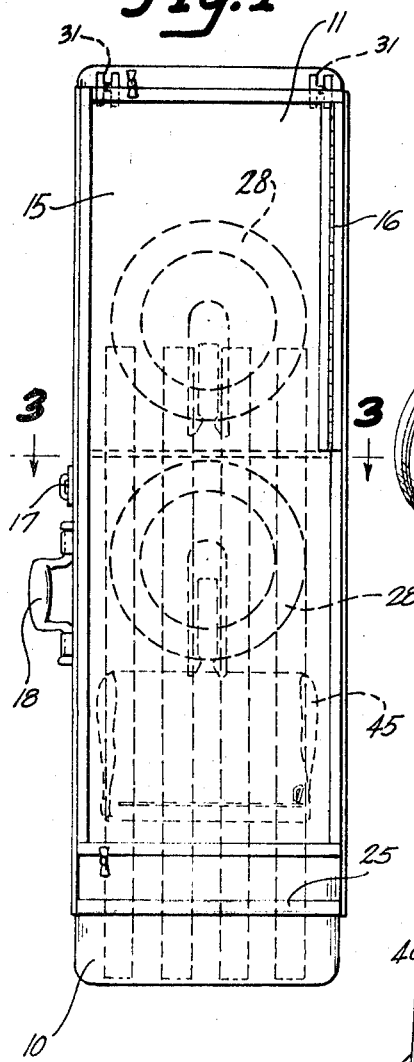
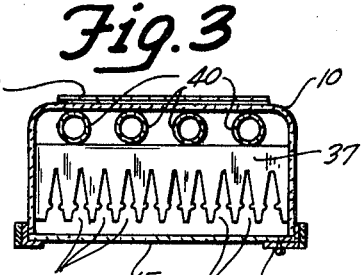
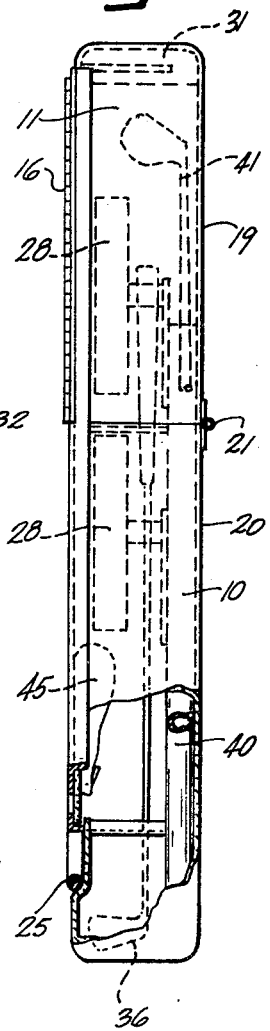
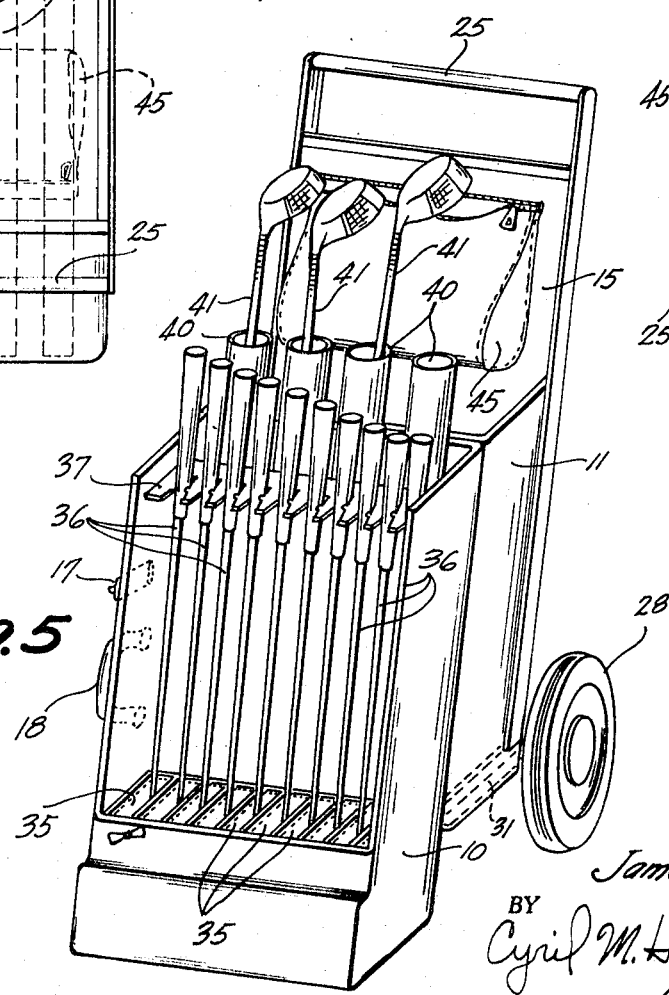
INVENTOR.
James Renock
BY Cyril M. Hajewski
Attorney

CONVERTIBLE GOLF CART

BACKGROUND OF THE INVENTION

The invention pertains generally to manually moved wheeled golf carts for transporting golf equipment over the golf course.

In order to facilitate the transportion of golf equipment over a golf course while participating in the game of golf it has become a common practice to provide wheeled carts for carrying the equipment. One of the problems with these carts lies in the fact that they are bulky and rather awkward to store when not in use. The wheels have been mounted on hinged brackets so that they can be pivoted toward each other and the handles are likewise pivotable to a compact position to facilitate storage and enable the cart to be carried in the storage compartment of an automobile. However, the golf clubs remained exposed or covered by a heavy cloth or other flexible material. Such carts still require a substantial amount of space for storage and are not suitable for shipping the golf equipment by public transportation.

More recently wheeled golf carts have been developed which can be converted into a fully enclosed case of rigid material. This type of golf cart is disclosed in U. S. Pat. Nos. 2,590,178 issued to Jamison on Mar. 25, 1952; 2,726,874 issued to Sullivan on Dec. 13, 1955 and 3,204,976 issued to Srigley on Sept. 7, 1965. The present invention is an improvement of this type of golf cart.

Although the golf cart of the present invention can be fully closed into a rigid walled case for storage and shipment, it is capable of carrying a full complement of golf equipment. When the case is closed the golf equipment is fully protected but when the case is opened, it provides the golfer with ready access to all of the equipment. A disadvantage to the convertible type of golf cart lies in the fact that it is inconvenient to open and close, but the golf cart of the present invention can be opened and closed in just a few moments with a minimum exertion. A hinged door serves as an enclosure for fully closing the cart for storage and this same door serves as a handle when the cart is open so that it is not necessary to provide and store a separate handle for manipulating the cart.

SUMMARY OF THE INVENTION

According to the present ivention, the improved golf cart comprises a lower storage compartment and an upper member which serves as a lid. The upper member is hinged to the lower compartment so that the two portions can be disposed back to back to fully expose the equipment in the cart.

A door is hinged to the upper member but is of sufficient length to overlie the lower compartment as well. Suitable latches are provided to retain the door in its closed position for complete protection of the golf equipment in the cart. Since the door is hinged to the upper member it will move through an arc with it when the upper member is pivoted downwardly to open the cart. The door is then placed in its closed position relative to the upper member and the portion that would cover the lower storage compartment when the cart is closed then extends upwardly above the upper member to serve as a handle which the golfer will grasp when manipulating the cart over the golf course.

Wheels are inserted into the upper lid member for supporting the cart and rendering it mobile. These wheels are readily removable for storage within the cart when it is closed.

DESCRIPTION OF THE DRAWING

The foregoing and other objects of the invention, which will become more fully apparent from the following detailed description, may be achieved by means of the apparatus described in connection with the accompanying drawings in which:

FIG. 1 is a view in front elevation of the golf cart of the present invention shown in its closed condition;

FIG. 2 is a view in side elevation of the golf cart shown in FIG. 1;

FIG. 3 is a view partly in plan and partly in section taken along the plane represented by the line 3—3 in FIG. 1 to show the arrangement of the storage tubes and notched plate for supporting the clubs within the cart;

FIG. 4 is a detail view of one of the wheels and its supporting structure for rendering the cart mobile when open; and FIG. 5 is a perspective view showing the cart depicted in FIG. 1 in its open condition for use on the golf course.

DESCRIPTION OF THE PREFERRED EMBODIMENT

Reference is now made more particularly to the drawings and specifically to FIGS. 1 and 2 thereof which illustrate a golf cart incorporating the features of the present invention, the golf cart being shown in its closed condition. As there shown, the cart comprises a lower storage compartment 10 and an upper storage compartment 11 which serves as a lid for the lower compartment 10 when the cart is in the closed condition as illustrated in FIGS. 1 and 2. To this end, when the cart is in the closed condition, the upper compartment 11 is an upward extension of the lower compartment 10 to create one elongated case as shown in FIG. 2.

The compartments 10 and 11 do not have front walls as is apparent from the perspective view in FIG. 5. However, when the cart is closed, these openings are closed by a door 15 which overlies the front opening of the upper compartment 11 as well as the front opening in the lower storage compartment 10. The door 15 is supported on the upper compartment 11 by means of a piano-type hinge 16 so that it can be pivoted between the closed position shown in FIG. 1 and a fully open position which is 180° from the position clearly illustrated in FIGS. 1 and 2. Although the door 15 completely overlies the lower storage compartment 10, it is not hinged to this lower compartment 10 but only to the upper compartment 11 by means of the hinge 16.

The door 15 is secured in the closed position by a latch mechanism 17. A handle 18 is mounted on the side wall of the lower compartment 10 so that it can be grasped for the purpose of carrying the cart in the manner of a suitcase. The walls of the compartment 10 and 11 are preferably formed of a rigid material and the door 15 is likewise formed of a rigid material. Since the entire unit is fully enclosed when it is in the closed position, the case fully protects its contents so that the cart with the golf equipment contained in it can be conveniently stored or shipped by public transportation.

When it is desired to use the cart for transporting golf equipment over a golf course while participating in the game of golf, the cart is opened to the condition clearly shown in the perspective view of FIG. 5. To this end, a back wall 19 of the upper storage compartment 11 is pivotally secured to a back wall 20 of the lower storage compartment 10 by a hinge 21. With this arrangement, the cart can be very rapidly and very conveniently opened by the simple and efficient expedient of opening the door 15, 180° from the position shown in FIG. 2, about the hinge 16 and then merely pivot the upper compartment 11, 180° in a clockwise direction, as viewed in FIG. 2, to the position shown in FIG. 5, so that the back 19 of the upper compartment 11 is now completely overlying the back 20 of the lower storage compartment 10. Since the door 15 is hinged to the upper compartment 11, it will swing with the compartment 11 and when the latter is fully pivoted to the open position, the door 15 is returned to its closed position against the front face of the upper compartment 11 and latched there so that it is secured in the position clearly illustrated in FIG. 5. However, since the door 15 pivoted through an arc of 180° with the upper compartment 11, its lower end which would be extending over the storage compartment 10 when the cart is in its closed condition, is now extending upwardly and this lower end is provided with a handle 25 which is now positioned at the upper end of the cart where it can be conveniently grasped by the golfer for manipulating the cart over the golf course.

In order to render the cart mobile when it is transporting golf equipment over a golf course, a pair of removable wheels 28 are provided. As clearly shown in the detail view of FIG. 4, the wheel 28 is journalled on a shaft 29 which has its extending end secured to a split bar 30. An H-shaped section 31 is mounted on each side of the upper end of the upper compartment 11 as shown in FIG. 1 and one side of the split bar 30 extends along each side of the horizontal web of the H-section 31. The horizontal web does not extend through the entire length of the section 31. The inner end of the split bar 30 is disposed between a pair of rivets 32 when the bar 30 is fully contained in the H-section 31. The rivets 32 prevent the two portions of the split bar 30 from separating relative to each other while the cart is being moved over the relatively rough terrain of a golf course.

The wheels 28 with their associated shafts 29 and split bar 30 are contained within the compartment 11 when the cart is in the closed condition. When the cart is opened, the wheels are removed from the compartment 11 and each wheel is mounted to one of the H-sections 31 that are rigidly secured within the upper end of the upper compartment 11. Of course, when the cart is opened, the upper compartment 11 is pivoted downwardly so that the H-sections are then located at the lower end of the cart where they will support the cart on the ground.

The lower portion of the lower compartment 10 is provided with a plurality of pockets 35 for receiving the heads of the golf club irons 36. Any number of pockets 35 can be provided, but 10 such pockets are shown in FIG. 5 for carrying the full complement of golf club irons that are available to a golfer. The upper portion of the compartment 10 is provided with a notched plate 37 which is best shown in FIG. 3. The plate 37 is provided with a plurality of notches 38 for receiving the handles of the golf clubs 36. Accordingly, the number of notches 38 will correspond to the number of pockets 35 and each notch 38 will be in vertical alignment with a cooperating pocket 35 so that the head of a golf club 36 will be in the pocket 35 and its handle will be supported within the notch 38 that cooperates with that particular pocket. The notched plate 37 is made of a resilient material, such as rubber, and the walls of the notches 38 are provided with small nodes which removably retain the handles of the golf clubs within the notches. However, a slight tug by the golfer will remove them.

Four cylindrical tubes 40 are supported between the notched plate 37 and the back wall of the storage compartment 10 for receiving the handles and shafts of the four golf club woods that are available to a golfer. The heads of the woods extend above the tubes 40 as shown in FIG. 5.

In addition to the supports for the golf clubs, a compartmented pocket 45 is provided on the door 15 for carrying the small items that a golfer requires, such as balls and tees.

When it is desired to close the cart, the wheels 28 are removed and the door 15 is pivoted 180° from the position shown in FIG. 5 and away from the compartment 11. The latter is then pivoted upwardly so that its lower edges are contiguous with the upper edges of the lower storage compartment 10. The door 15 is then pivoted back to its closed position as shown in FIG. 1 and the latch 17 is actuated to secure the door 15 in position. The case is now fully closed with the wheels 28 being stored within the upper compartment 11. There is also sufficient room in this upper compartment for receiving golf shoes and other equipment which the golfer may carry with him. He may now grasp the handle 18 and carry the entire cart just as he would carry a suitcase. It may be conveniently stored or shipped and the golf equipment contained therein is fully protected.

From the foregoing detailed description of the construction and operation of the illustrative embodiment of the present invention it will become apparent that a new and improved convertible golf cart has been provided which forms a rigid wall case of rectangular dimensions that fully protects the golf equipment contained therein and occupies a minimum amount of space when stored. The golf cart can be very readily and conveniently converted to a closed container or an open cart for use on the golf course and a hinged door which closes the case when in the closed condition, serves as a handle for manipulating the cart when the latter is in its open condition.

Although the illustrative embodiment of the present invention has been described in considerable detail for the purpose of making a full disclosure of a practical operative embodiment by means of which the invention may be practiced, it is to be understood that various novel features of the invention may be incorporated in other arrangements without departing from the spirit and scope of the invention as defined in the subjoined claims.

The principles of the invention having now been fully explained in connection with the foregoing description of the illustrative embodiment, the invention is hereby claimed as follows:

1. In a golf cart for carrying golf equipment; a lower compartment; an upper compartment hinged to said lower compartment for pivotal movement from a closed position in which the contents of the cart are fully enclosed, to an open position in which the contents of the cart are exposed; a transverse hinge connecting said lower compartment to said upper compartment so that said upper compartment can be pivoted to the closed position where it becomes an extension of the lower compartment so that the two compartments together form an elongated case for retaining the golf equipment, said upper compartment being pivotable away from its closed position to its open position wherein it is in juxtaposition with said lower compartment to fully expose the contents of the cart; and a pair of wheels mounted on said cart for rendering it mobile when it is in its open condition with the two compartments in juxtaposition with each other.

2. A golf cart according to claim 1 including; a door mounted to close said compartments for enclosing the contents of the cart; a handle on said door; and means for moving said door to an open position for rendering the contents of the cart accessible, said handle moving with said door into the open position where it may be grasped by the golfer for manipulating the cart over the golf course.

3. A golf cart according to claim 1 including; a door supported by said upper compartment to overlie both of said compartments for fully enclosing the contents of the cart when it is being stored, said door moving with the pivotal movement of said upper compartment to an open position to fully expose the contents of the cart so that they are accessible to the golfer.

4. A golf cart according to claim 3 including; a handle on said door, said handle being in an idle position when said door is closed, but said handle moves with said door to the open position where it becomes readily accessible to the golfer for manipulating the cart over the golf course.

5. A golf cart according to claim 1 including; a back wall on said lower compartment; a back wall on said upper compartment; and a hinge pivotally connecting the back wall of said lower compartment to the back wall of said upper compartment so that when the cart is closed said upper compartment rests on the lower compartment to form an upper extension of said lower compartment for enclosing the contents of the cart, said upper compartment being pivotable substantially 180° about said hinge to the open position wherein its back wall is resting against the back wall of said lower compartment for fully exposing the contents of the cart.

6. A golf cart according to claim 1 including; means for removably mounting said wheels to said upper compartment when said upper compartment is in its open position for rendering the cart mobile, said wheels being stored within the cart when said upper compartment is in its closed position.

7. A golf cart according to claim 1 including; means mounted in said lower compartment for individually supporting a plurality of golf clubs in an upright position.

* * * * *